Jan. 8, 1963 R. D. HAWKINS 3,072,393
VIBRATION AND SHOCK MOUNT ASSEMBLY
Filed Aug. 11, 1961

INVENTOR.
ROBERT D. HAWKINS
BY
ATTORNEY

United States Patent Office 3,072,393
Patented Jan. 8, 1963

3,072,393
VIBRATION AND SHOCK MOUNT ASSEMBLY
Robert D. Hawkins, Greenlawn, N.Y., assignor to Sperry Rand Corporation, Great Neck, N.Y., a corporation of Delaware
Filed Aug. 11, 1961, Ser. No. 131,004
10 Claims. (Cl. 267—1)

This invention relates to an assembly of parts providing a vibration and shock isolating mount that is attached for use to an object of a geometrical shape having two-sided or three-sided corners.

One of the essential parts of the improved isolating assembly is provided by a rigid corner shaped member with included flat surfaces whose angular disposition is such as to conform to the corner configuration of the object that it is designed to be used on.

Compressible elastic parts for the related flat surfaces of the rigid corner member provide the isolating properties of the improved assembly. The elastic parts utilized in the assembly are preferably provided by equally sized pieces of resilient material such as rubber of an egg crate type cell pattern of buckling walls as shown and described in my copending U.S. application Serial No. 120, filed January 4, 1960 for Vibration and Shock Isolators. Individual elastic parts of this type have the isolating characteristics of a non-linear spring.

The third essential part is provided by the pliant tie members that are included for the compressible isolators on the rigid corner member. The assembly is attached to the object with the connecting tie members of such a fixed length as not to compress the elastic parts or part under no load conditions. As the tie members are inextensible and the rigid member to which the same are attached is a corner fitting, the isolators of the assembly are coupled by the tie members under loading conditions regardless of the direction of the load with respect to the assembly.

The primary object of the invention is to provide a corner fitting assembly of the character described in which the included isolators are coupled together by pliant tie members.

The improved assembly preferably includes one or two rigid corner fittings, two or three compressible isolators with respective planar shock faces and a necessary number of pliant tie members.

Figure 1:
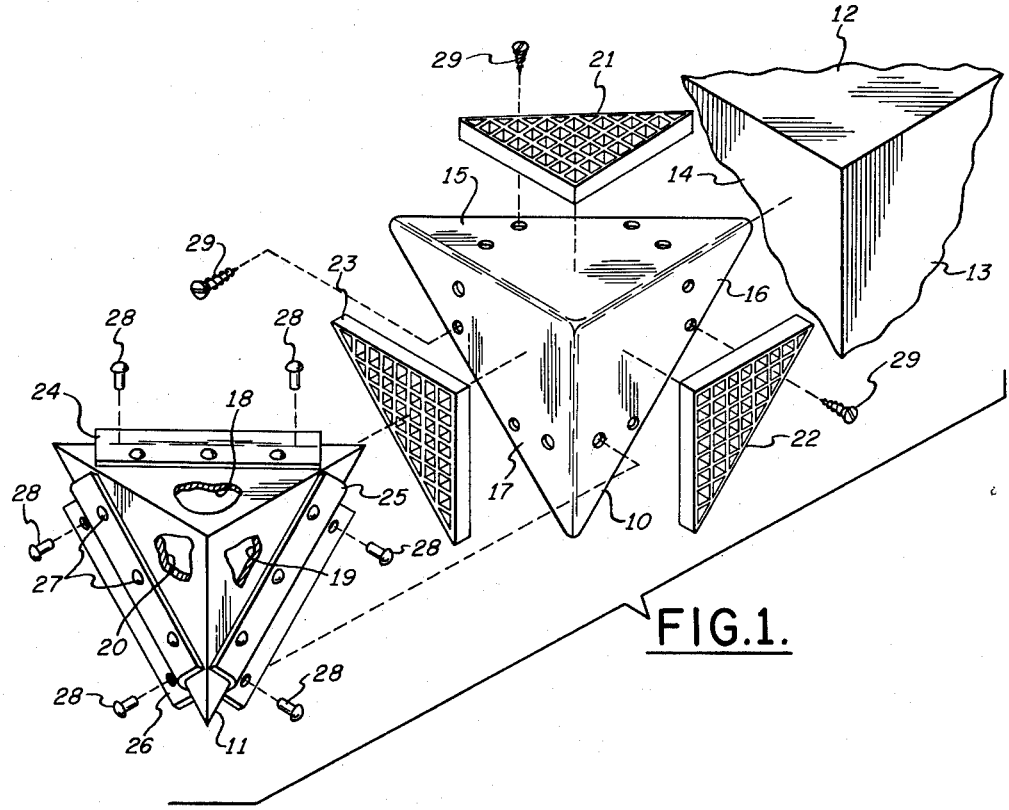
Figure 2:
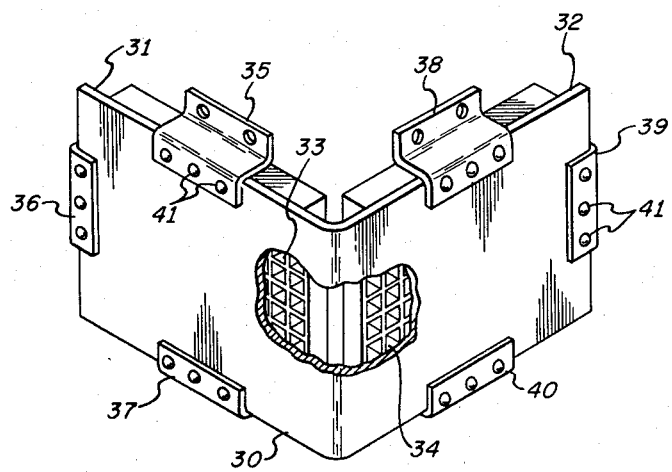

Further objects, features and structural details of the improved assembly will be apparent from the following description when read in relation to the accompanying drawing, wherein FIG. 1 is a perspective view of an embodiment of the improved assembly showing the parts in exploded relation with respect to one of the corners of an object of cubic shape to which the assembly is attached for use, and FIG. 2 is a perspective view of a modified form of the improved assembly in which the base corner fitting part shown in FIG. 1 is not used.

In the form of the invention shown in FIG. 1, the two part corner fitting includes a rigid base 10 and a conforming rigid cover 11. The base 10 of the assembly is shaped to fit on one of the three sided corners of a cubic body whose respective relatively perpendicular three flat surfaces are indicated at 12, 13 and 14. Base fitting part 10 accordingly includes three external relatively perpendicular flat surfaces 15, 16 and 7 corresponding to the surfaces 12, 13 and 14 of the cubic body. The conforming rigid cover 11 also includes three internal relatively perpendicular flat surfaces 18, 19 and 20 corresponding to the surfaces 15, 16 and 17 of the base 10.

This embodiment of the invention utilizes three appropriately shaped isolators 21, 22 and 23 that may be formed as an integral unit with connecting edges if desired. As shown in FIG. 1, the isolators 21, 22 and 23 are preferably provided by unitary pieces of rubber having an egg crate type cell pattern of buckling walls as described in the heretofore identified application for U.S. Letters Patent. The physical dimensions of the isolators depends on the areas of the flat surfaces of the fitting parts 11 and 12, the spacing of the parts between which the isolators are sandwiched, the characteristics of the material of which the isolators are constructed as well as the loading to be handled. The isolators shown in FIG. 1 have a triangular geometrical configuration shaped to conform to the area of the flat surfaces of the base 10 and cover 11. The walls of the cell structure of the isolators buckle under compressive loading with the characteristics of a nonlinear spring. The planar faces of the isolators are parallel and normal to the buckling walls of the cell structure. As shown in FIG. 1, a compressible isolator is provided for each of the three related flat surfaces of the base 10 and cover 11 of the assembly. In assembled condition, the isolator 21 is sandwiched between the base surface 15 and cover surface 18. Isolator 22 of the assembly is similarly located between the base surface 16 and cover surface 19. Isolator 23 is likewise sandwiched between the base surface 17 and cover surface 20.

In the FIG. 1 embodiment of the invention, the parts are assembled in the form of pliant straps 24, 25 and 26 that are connected at one end to the cover part 11 by suitable rivets as indicated at 27. The straps or spacers 24, 25 and 26 are preferably constructed of an inextensible fabric material such as nylon that is provided with a suitable protective covering. In assembled condition, the respective straps 24, 25 and 26 are also connected at the opposite ends thereof to the base part 11. These connections are provided by the rivets 28 indicated in FIG. 1, the tie means between the cover part 11 and base part 10 being such as to mount the isolators 21, 22 and 23 in uncompressed condition with the load faces thereof sandwiched between the respective related internal flat surfaces of the cover and the external flat surfaces of the base. The parts as an assembly are then attached to one of the corners of a cubic body such as represented by the surfaces 11, 12 and 13 in FIG. 1 by suitable fastening means between the base 10 and the body such as wood screws 29. Three sided corner fitting assemblies of the type described may be utilized on all of the corners of a geometrical body where the same are required. Under load, the pliant tie members couple the compression isolators so that the same function collectively rather than individually in the assembly. The assembly handles loads in all directions because of its corner structure and requires isolators of smaller individual dimension because the tie means between the parts is provided by straps of equal length. Where the assembly includes both cover and base corner fitting parts as shown in FIG. 1, the sandwiched isolators 21, 22 and 23 at the respective planar faces thereof are engaged between the respective related flat surfaces 15—18, 16—19 and 17—20.

In the form of the invention in which only a single corner fitting part is used, the rigid corner part or member is directly connected to the body to which it is attached by the provided straps rather than by the base part 10. In the three sided corner arrangement shown in FIG. 1, the modified assembly consists of the rigid cover 11 with the three internal flat surfaces 18, 19 and 20, a resilient isolator 23 with a planar face for the internal flat surface 20 of the cover 11 and a parallel face, a resilient isolator 22 with a planar face for the internal flat surface 19 of the cover 11 and a parallel face, a resilient isolator 21 with a planar face for the internal flat surface 18 of the cover and a parallel face, and the related pliant tie members 24, 25 and 26 connected to the cover for the respective isolators. Here, the assembly is mounted under no load conditions with the isolators 21, 22 and 23 uncompressed against the respective body surfaces 12, 13 and 14 by directly connecting the tying straps 24, 25 and 26 to the body surfaces by suitable fastening means such as the screws 29. In this form of the invention, the respective planar faces of the isolators 21, 22 and 23, are sandwiched between the respective flat body surfaces 12, 13, 14 and the related internal flat surfaces 18, 19 and 20 of the rigid cover member 11. The means for mounting the assembly includes a pliant tie member connected to the member 11 for each of the isolators of the assembly.

In the double sided corner fitting embodiment of the improved assembly shown in FIG. 2, the rigid member 30 is a single cover fitting having two angularly disposed flat surfaces 31 and 32. Where the surfaces on which the assembly is mounted are mutually perpendicular such as the surfaces 13 and 14 shown in FIG. 1, the angle between the respective flat surfaces 31 and 32 of the member 30 is a right angle. In this form of the invention, the assembly utilizes two rather than three isolators. As shown in FIG. 2, the isolators 33 and 34 conform to the square configuration of the respective flat surfaces 31 and 32 of the member 30. Isolator 33 includes a planar face for the flat surface 31 and a parallel planar face. Similar isolator 34 includes a planar face for the flat surface 32 and a parallel planar face. Here, each of the isolators utilizes three pliant tie members as respectively indicated at 35, 36 and 37 for isolator 33 and 38, 39 and 40 for isolator 34 for coupling purposes. As shown in FIG. 2, the respective tie means are straps of the character shown in FIG. 1 that are connected at one end to the member 30 by means of suitable rivets 41. The other ends of the connecting straps are directly mounted as heretofore described to the fitting surfaces of a corner body by suitable fastenings such as screws 29. The type, number and arrangement of the improved assemblies on the load providing body depends on the size and configuration of the body and the load to be handled.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A vibration and shock mount assembly comprising a rigid base in the form of a corner fitting having external flat surfaces, a rigid cover conforming to the configuration of the corner fitting having corresponding internal flat surfaces, a compressible isolator of resilient material for each of the related surfaces of the assembly having parallel planar faces, and tie means of pliant material connecting the cover and base with the uncompressed isolators mounted with the faces thereof sandwiched between the respective related internal and external flat surfaces of the cover and base.

2. An assembly of the character claimed in claim 1, in which the isolators are unitary pieces of rubber having an egg crate type cell pattern of buckling walls.

3. An assembly of the character claimed in claim 1, in which said tie means are provided by straps of equal length that are connected at one end to the cover and at the other end to the base.

4. A vibration and shock mount assembly comprising a rigid base in the form of a corner fitting having three external relatively perpendicular flat surfaces, a rigid cover conforming to the configuration of the corner fitting having three corresponding internal relatively perpendicular flat surfaces, a compressible isolator of resilient material for each of the three related surfaces of the assembly having parallel planar faces, and tie means of pliant material connecting the cover and base with the respective uncompressed isolators mounted with the faces thereof sandwiched between the respective related internal and external flat surfaces of the cover and base.

5. An assembly of the character claimed in claim 4, in which the three isolators are unitary pieces of rubber having an egg crate type cell pattern of buckling walls.

6. An assembly of the character claimed in claim 4, in which said tie means are provided by three straps of equal length that are connected at one end to the cover and at the other end to the base.

7. A vibration and shock mount assembly comprising a rigid cover in the form of a corner fitting having three relatively perpendicular flat surfaces, a compressible isolator with a planar face for one of the flat surfaces of the cover and a parallel planar face, a compressible isolator with a planar face for another of the flat surfaces of the cover and a parallel planar face, a compressible isolator with a planar face for the third of the flat surfaces of the cover and a parallel planar face, and tie means for mounting the assembly on a corner member with the three isolators in uncompressed condition including a pliant tie member for each isolator connected to the cover.

8. An assembly of the character claimed in claim 7 in which the three isolators are unitary pieces of rubber having an egg crate cell pattern of buckling walls, and the pliant tie members are straps.

9. A vibration and shock mount assembly comprising a rigid cover in the form of a corner fitting having two relatively perpendicular flat surfaces, a compressible isolator with a planar face for one of the flat surfaces of the cover and a parallel planar face, a compressible isolator with a planar face for the other of the flat surfaces of the cover and a parallel planar face, and tie means for mounting the assembly on a corner member with the two isolators in uncompressed condition including a pliant tie member for each isolator connected to the cover.

10. An assembly of the character claimed in claim 9, in which the two isolators are unitary pieces of rubber having an egg crate cell pattern of buckling walls, and the pliant tie members are straps.

References Cited in the file of this patent

UNITED STATES PATENTS

| | | |
|---|---|---|
| 1,853,617 | Hutchcroft | Apr. 12, 1932 |
| 2,836,227 | Swenson | May 27, 1958 |
| 2,965,371 | Gulardo | Dec. 20, 1960 |
| 2,993,673 | Villar | July 25, 1961 |